(12) United States Patent
Tanaka

(10) Patent No.: US 6,657,958 B1
(45) Date of Patent: Dec. 2, 2003

(54) BANDWIDTH CONTROL SYSTEM AND METHOD

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/313,756

(22) Filed: May 18, 1999

(30) Foreign Application Priority Data

May 18, 1998 (JP) ............................................. 10-135585

(51) Int. Cl.[7] .......................... H04L 12/56; G06F 13/00
(52) U.S. Cl. ............... 370/230.1; 370/236; 370/395.41; 709/238
(58) Field of Search .............................. 370/230, 230.1, 370/235, 235.1, 236, 252, 253, 389, 395.1, 395.2, 395.21, 395.4, 395.41, 412; 709/232, 234, 235, 238

(56) References Cited

U.S. PATENT DOCUMENTS

| | | | | |
|---|---|---|---|---|
| 5,509,010 A | * | 4/1996 | La Porta et al. | 370/68.1 |
| 5,577,035 A | * | 11/1996 | Hayter et al. | 370/60 |
| 5,737,312 A | | 4/1998 | Sasagawa | 370/232 |
| 5,784,358 A | * | 7/1998 | Smith et al. | 370/230 |
| 6,038,611 A | * | 3/2000 | Masel | 709/302 |
| 6,175,572 B1 | * | 1/2001 | Kim | 370/468 |
| 6,282,197 B1 | * | 8/2001 | Takahashi et al. | 370/395 |

FOREIGN PATENT DOCUMENTS

| | | |
|---|---|---|
| JP | 64-12740 | 1/1989 |
| JP | 2-71646 | 3/1990 |
| JP | 3-210858 | 9/1991 |
| JP | 4-45632 | 2/1992 |
| JP | 4-258055 | 9/1992 |
| JP | 6-276210 | 9/1994 |
| JP | 6-338903 | 12/1994 |
| JP | 6-338918 | 12/1994 |
| JP | 7-143128 | 6/1995 |
| JP | 8-204723 | 8/1996 |
| JP | 8-340339 | 12/1996 |
| JP | 10-65679 | 3/1998 |

* cited by examiner

*Primary Examiner*—Alpus H. Hsu
(74) *Attorney, Agent, or Firm*—Foley & Lardner

(57) ABSTRACT

A bandwidth control system in a communication device includes a transmission bandwidth controller for making a decision as to whether it is possible to allocate a requested transmission bandwidth for requested data transmission through the link by referring to a bandwidth management table. Based on a result of the decision of transmission bandwidth allocation, a signaling controller controls the processing of a UNI (User-Network Interface) signaling procedure.

10 Claims, 7 Drawing Sheets

| 215 | 212 | 213 | 214 | 206 |
|---|---|---|---|---|
| CALL REFERENCE | Transmission allocation bandwidth | Currently-used transmission bandwidth | Unused transmission bandwidth | |
|  |  |  |  |  |
|  |  |  |  |  |
| ⋮ | ⋮ | ⋮ | ⋮ | |

BANDWIDTH CONTROL SYSTEM AND METHOD

BACKGROUND OF THE INVENTION

1. Field of the Invention

The present invention relates to bandwidth control techniques in an ATM (asynchronous transfer mode) network, and more particularly to control method and system for controlling the bandwidth of a link between communication devices in the ATM network.

2. Description of the Related Art

A Broadband-ISDN (Integrated Services Digital Network) based on an ATM technology extends the digital transmission capabilities defined by ISDN to allow high-speed voice, data, and moving picture for multimedia transmissions on the same lines with reliability.

Information exchanges in the ATM network are carried out either on a permanent virtual channel (PVC) connection with fixed communication parties or on a switched virtual channel (SVC) connection in which communication parties can be selected.

The PVC connection is a connection established when a subscriber declares in advance a communication bandwidth for carrying out data communications at the time of making a contract with an ATM network provider.

On the other hand, the SVC connection is a connection established by the following steps. At first, when a subscriber requires a communication line for carrying out data communication, the subscriber sets a required communication bandwidth to a SETUP message based on a user-network interface (UNI) signaling procedure and transmits this SETUP message to the ATM network. This causes a line connection negotiation with the ATM network to establish the connection. The UNI signaling procedure is a procedure as prescribed in the ATM Forum Technical Committee User-Network Interface (UNI) Specification Version 3.1, the ATM Forum Technical Committee ATM UNI signaling Specification Version 4.0, ITU-T Recommendation Q.2931, and ITU-T Recommendation Q.2971.

In the ATM public network, convenience of users and flexibility of the ATM network are being improved by carrying out establishment and release of SVC connections according to the UNI signaling procedure between the ATM switches. The bandwidth control system is being investigated as a means for further improving the flexibility of the ATM network and for providing effective utilization of data communication bandwidths by restricting redundancies within the ATM public network.

One example of a conventional bandwidth control system is a system for carrying out bandwidth control in the process of establishing a SVC connection according to the UNI signaling procedure. According to this conventional system, an ATM switch includes a signaling controller for controlling the processing of the UNI signaling procedure, and a bandwidth controller for controlling the communication bandwidths of an ATM cell transmission line and an ATM cell reception line using a single bandwidth management table.

When the signaling controller receives a SETUP message (a setup request for an SVC connection) according to the UNI signaling procedure from a subscriber ATM terminal or an ATM subscriber transmission apparatus through a UNI signaling channel, the signaling controller outputs this SETUP message to the bandwidth controller. The bandwidth controller obtains a bandwidth value declared to the ATM public network from the received SETUP message, and decides whether or not it is possible to establish the requested bandwidth by referring to the bandwidth management table. In this decision, the bandwidth controller decides both a data transmission line and a data reception line together.

In other words, bandwidth information of both a transmitter side unused bandwidth and receiver side unused bandwidth is set in the bandwidth management table. The bandwidth controller compares the requested bandwidth value obtained from the SETUP message with the unused bandwidths for each of the transmitter side unused bandwidth and the receiver side unused bandwidth. As a result, if it has been confirmed in both bandwidths that the requested bandwidth value is smaller than the unused bandwidth value, the bandwidth controller informs the signaling controller that the request for an establishment of an SVC connection is possible. Then, the signaling controller starts the processing of the UNI signaling procedure such as a transmission of the SETUP message and the like.

On the other hand, if it has been confirmed in both bandwidths that the requested bandwidth value is greater than the unused bandwidth value, the bandwidth controller informs the signaling controller that the request for an establishment of an SVC connection is not possible. Then, the signaling controller stops the processing of the UNI signaling procedure.

According to another conventional bandwidth control, when it is necessary to establish a new SVC connection in an ATM cell transmission line and an ATM cell reception line, the signaling controller establishes the SVC connection according to the UNI signaling procedure. This SVC connection becomes the data channel for data communications. Thereafter, the bandwidth controller controls the bandwidth by transmitting and receiving bandwidth control information to and from the opposite party device of the transmission line through this data channel.

There has been still another conventional system for carrying out bandwidth control according to an originally defined procedure. A CLAD apparatus of ATM network is disclosed in Japanese Patent Application Laid-open Publication No. 8-204723. In the CLAD apparatus, there is disclosed a bandwidth control system for achieving the bandwidth control of the ATM public network by defining an own format for the bandwidth control in OAM (operation and maintenance) cell which are originally designed for carrying out fault management or performance management and transmitting and receiving bandwidth control information by transmitting and receiving the OAM cells through the data channel.

Further, an ATM communication terminal apparatus is disclosed in Japanese Patent Application Laid-open Publication No. 7-143128. According to the ATM communication terminal apparatus, there is disclosed a bandwidth control system for achieving the bandwidth control of the ATM public network by defining an own cell format for the bandwidth control and transmitting and receiving the cells through the data channel.

According to the conventional bandwidth control system where both the communication bandwidth of the ATM cell transmission line and the communication bandwidth of the ATM cell reception line are managed together in the single bandwidth management table, it becomes necessary to install tables for managing mutually different communication bandwidths for ATM cell transmission and reception lines of different bandwidths in the case where the communication bandwidths asymmetrical in upstream and downstream directions are to be controlled.

Particularly, in the case where an ATM subscriber transmission apparatus accommodating a large number of subscriber ATM terminals carries out a bandwidth control of the ATM subscriber line, the above-described new installation of bandwidth management tables leads to an increase in the memory capacity provided in the ATM subscriber transmission apparatus, resulting in cost increase. This is against the requirement that the ATM subscriber network should be structured at low cost, and thus this must be avoided.

Further, in the case where an SVC connection cannot be established if the requested bandwidth value is larger than the unused bandwidth value, however, there is also such a possibility that the ratio of the unused bandwidth value to the requested bandwidth value is relatively high, for example, 0.95, although the requested bandwidth value is larger than the unused bandwidth value. If the unused bandwidth ratio is 0.95, for example, it must be possible to carry out sufficient data communications if an SVC connection is established by using the unused bandwidth value of the bandwidth management table with this 95% set as a communication bandwidth guarantee factor.

Since it is not possible to carry out flexible bandwidth control in the conventional bandwidth control system as described above, there is a possibility that this conventional system increases a refusal rate of a request for establishing an SVC connection and further generates a surplus of unused communication bandwidth.

Furthermore, according to the bandwidth control system disclosed in the above publications, bandwidth control is carried out based on an own procedure that bandwidth information is set in OAM cells and ATM cells after establishing a data channel. If an ATM network such as an ATM public network or an ATM subscriber network is constructed by including apparatuses having different bandwidth control systems, each apparatus transmits cells for executing the bandwidth control of an ATM network. However, there is a possibility that one apparatus cannot understand cells transmitted from the other apparatus, thus failing in achieving a targeted effective bandwidth control.

SUMMARY OF THE INVENTION

It is an object of the present invention to provide a bandwidth control method and system capable of achieving a flexible control and effective utilization of a communication bandwidth for an ATM network.

It is another object of the present invention to provide a bandwidth control method and system capable of achieving mutual connections of communication devices without increasing the cost thereof.

According to the present invention, in a communication device including a transceiver for transmitting and receiving ATM cells to and from another communication device through a link, there is provided a transmission bandwidth controller for making a decision as to whether it is possible to allocate a requested transmission bandwidth for requested data transmission through the link by referring to a bandwidth management table. A signaling controller controls the processing of a UNI (User-Network Interface) signaling procedure based on a result of the decision of transmission bandwidth allocation.

The transmission bandwidth controller preferably holds a communication bandwidth guarantee factor. If the requested transmission bandwidth is greater than an available transmission bandwidth in the link, the transmission bandwidth controller compares an available bandwidth ratio of the available transmission bandwidth to the requested transmission bandwidth with the communication bandwidth guarantee factor to make a decision as to whether it is possible to allocate a practicable transmission bandwidth for the data transmission.

Further, if the available bandwidth ratio is greater than the communication bandwidth guarantee factor, then the transmission bandwidth controller reduces the requested transmission bandwidth into a practicable transmission bandwidth and determines that it is possible to allocate the practicable transmission bandwidth. Thereafter, the signaling controller produces a SETUP message for making a request for establishing the virtual channel having the practicable transmission bandwidth in the link, and then starts the UNI signaling procedure. If the available bandwidth ratio is smaller than the communication bandwidth guarantee factor, then the transmission bandwidth controller determines that it is not possible to allocate a practicable transmission bandwidth and the signaling controller stops the UNI signaling procedure.

According to another aspect of the present invention, in a bandwidth control system for a link between communication devices, each comprising: a transceiver for transmitting and receiving ATM cells to and from another communication device through the link; a bandwidth management table containing a call reference, an allocated transmission bandwidth, a currently-used transmission bandwidth, and an unused transmission bandwidth; a bandwidth controller for controlling a bandwidth for only data transmission using the bandwidth management table and for making a decision as to whether it is possible to allocate a requested transmission bandwidth for requested data transmission through the link by referring to the bandwidth management table; and a signaling controller for controlling a UNI (User-Network Interface,) signaling procedure based on a result of the decision of transmission bandwidth allocation.

DESCRIPTION OF THE PREFERRED EMBODIMENTS

Figure 1:
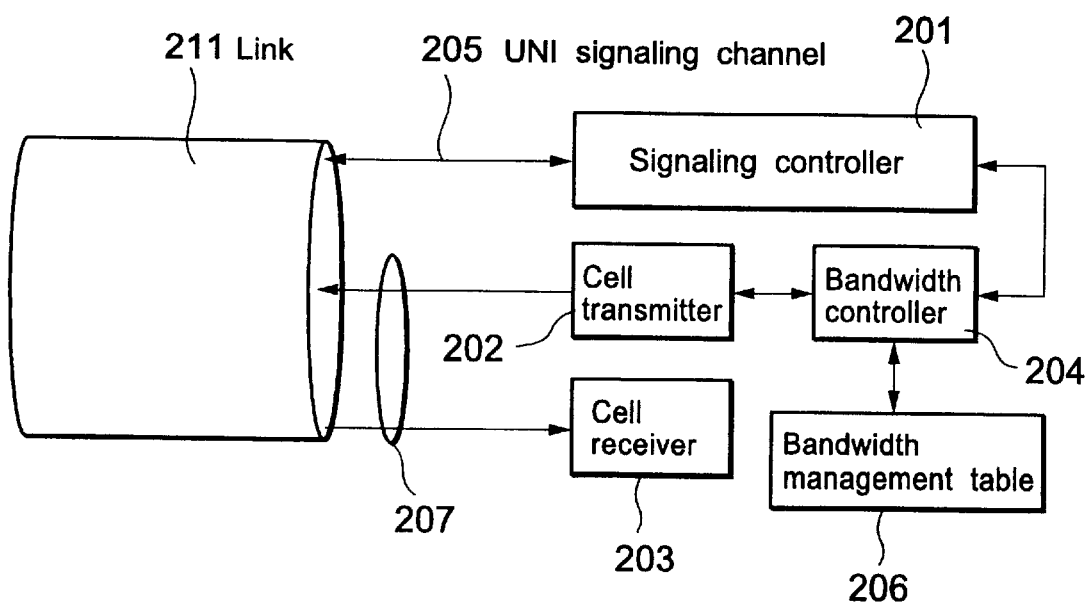
FIG. 1 is a block diagram for showing a basic configuration of a bandwidth control system according to an embodiment of the present invention.

Referring to FIG. 1, a bandwidth control system according to an embodiment of the present invention is basically structured by a signaling controller 201, a cell transmitter 202, a cell receiver 203, a bandwidth controller 204, and a bandwidth management table 206. The bandwidth controller 204 is connected to the signaling controller 201, the cell transmitter 202 and the bandwidth management table 206.

A link 211 includes a UNI signaling channel 205 which is used by the signaling controller 201 and a data channel 207 used by the cell transmitter 202 and the cell receiver 203. This link 211 is any one of a link between a subscriber ATM terminal and an ATM switch, a link between a subscriber ATM terminal and an ATM subscriber transmission apparatus, a link between an ATM subscriber transmission apparatus and an ATM switch, and a link between ATM switches (see FIG. 6).

Figures 2A, 2B:
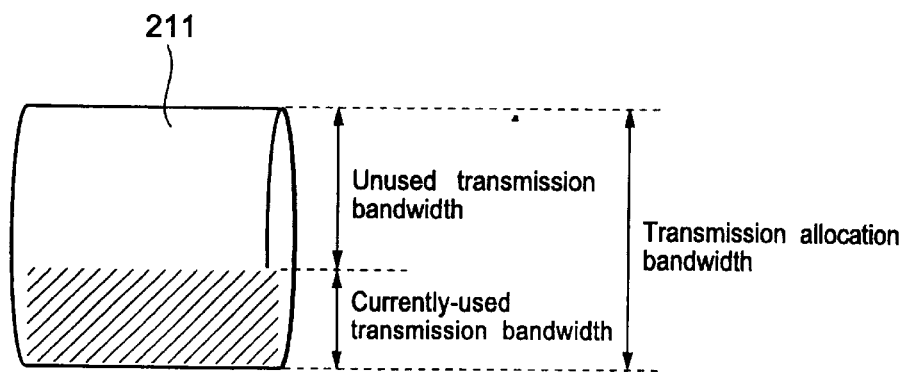
FIG. 2A is a schematic diagram showing a link in the embodiment for explaining a relationship between an unused transmission bandwidth, a currently-used transmission bandwidth and a transmission allocation bandwidth.
FIG. 2B is a diagram showing the field structure of a bandwidth management table employed in the embodiment.

As shown in FIG. 2A, a transmission allocation bandwidth of the data channel 207 of the link 211 consists of an unused transmission bandwidth and a currently-used transmission bandwidth. In the present embodiment, only the bandwidth information relating to a transmission allocation bandwidth of the data channel 207 of the link 211 is set in the bandwidth management table 206 for management.

As shown in FIG. 2B, the bandwidth management table 206 has an allocation bandwidth field 212 for holding a transmission allocation bandwidth, a currently-used bandwidth field 213 for holding a currently-used transmission bandwidth, an unused bandwidth field 214 for holding an unused transmission bandwidth, and a call reference field 215 for holding a call reference. The call reference is an identification number for identifying an individual SVC connection and a bandwidth being used by this SVC connection.

In the bandwidth controller 204, there is set in advance a communication bandwidth guarantee factor for deciding whether it is possible or not to set up an SVC connection based on a ratio of a requested bandwidth value to an unused transmission bandwidth value.

Figure 3A:
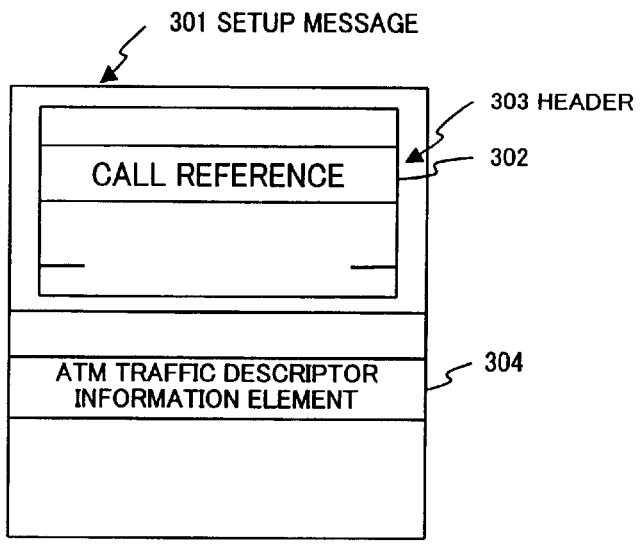
FIG. 3A is a diagram showing a format of a basic SETUP message to be used in the basic configuration of the bandwidth control system of FIG. 1.
Figure 3B:
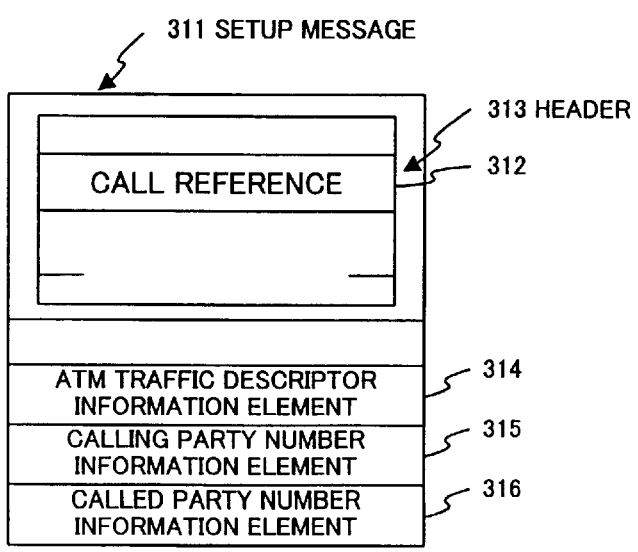
FIG. 3B is a diagram showing a format of a SETUP message to be used in actual application.

As shown in FIGS. 3A and 3B, a SETUP message to be used in a UNI signaling procedure to be processed by the signaling controller 201 for declaring a communication bandwidth value to an ATM network is structured.

In FIG. 3A, the SETUP message 301 is used in the bandwidth control system of the basic configuration shown in FIG. 1. The SETUP message 301 includes a header 303 of a UNI signaling prescription and an ATM traffic descriptor 304. The header 303 includes a call reference 302 for identifying a SVC connection. In the ATM traffic descriptor 304, a requested communication bandwidth value is described as an information element.

As shown in FIG. 3B, a SETUP message 311 has a few functions added to the above-described basic configuration to enable it to be used in a concrete apparatus. More specifically, the SETUP message 311 has a calling party number 315 and a called party number 316 in addition to a header 313 and an ATM traffic descriptor 314. The header 313 similarly includes a call reference 312.

The operation of the bandwidth control system of the present embodiment having the above-described structure will be explained with reference to FIG. 4.

Figure 4:
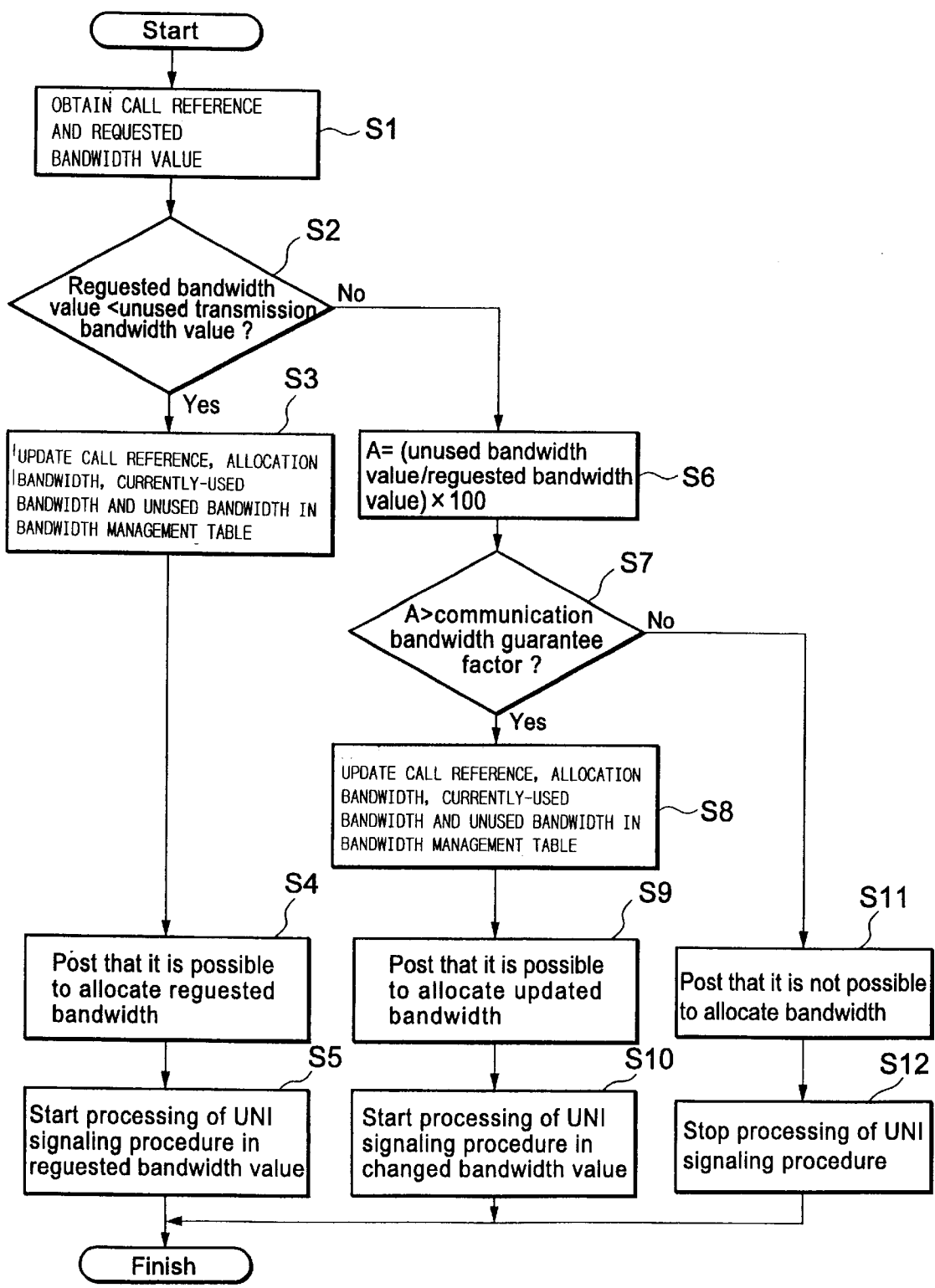
FIG. 4 is a flowchart showing an operation of the bandwidth control system according to the present invention.

Referring to FIG. 4, at first, the signaling controller 201 builds up the SETUP message 301 set with a call reference and a requested bandwidth value, prior to the establishment of an SVC connection by executing the processing of the UNI signaling procedure. The signaling controller 201 then makes an output to the bandwidth controller 204 to provide the bandwidth controller 204 with the call reference and the requested bandwidth value (step S1).

The bandwidth controller 204 takes out an unused transmission bandwidth value from the bandwidth management table by referring to the call reference, and compares the requested bandwidth value with the unused transmission bandwidth value (step S2).

If the requested bandwidth value is smaller than the unused transmission bandwidth value as a result of the comparison (YES in step S2), the bandwidth controller 204 updates the call reference of the corresponding SVC connection, the transmission allocation bandwidth, the currently-used transmission bandwidth and the unused transmission bandwidth in the bandwidth management table 206 (step S3). Then, the bandwidth controller 204 informs the signaling controller 201 that it is possible to allocate the requested bandwidth to a SVC connection. (step S4).

With the above processing, the signaling controller 201 starts the processing of the UNI signaling procedure based on the requested bandwidth value by using the SETUP message 301 built up at the beginning, and thus establishes the SVC connection (step S5).

On the other hand, if the requested bandwidth value is greater than the unused transmission bandwidth value as a result of the comparison (NO in step S2), the bandwidth controller 204 calculates an unused bandwidth ratio A by dividing the unused transmission bandwidth by the requested bandwidth value and then multiplying the result by 100 (step S6). Thereafter, the unused bandwidth ratio A is compared with the set communication bandwidth guarantee factor (step S7).

If the unused bandwidth ratio A is larger than the communication bandwidth guarantee factor as a result of the comparison (YES in step S7), the bandwidth controller 204 updates the call reference of the corresponding SVC connection, the transmission allocation bandwidth, the currently-used transmission bandwidth and the unused transmission bandwidth in the bandwidth management table 206 (step S8), and informs the signaling controller 201 that it is possible to allocate the bandwidth based on the bandwidth value which has been changed from the requested bandwidth value (step S9).

With the above processing, the signaling controller 201 rewrites the requested bandwidth value of the SETUP message 301 built up at the beginning to the changed bandwidth value, starts the processing of the UNI signaling procedure, and thus establishes the SVC connection (step S10).

Based on the processing using the communication bandwidth guarantee factor, it becomes possible to lower the refusal rate of a request for establishing an SVC connection and to avoid generation of surplus communication bandwidth.

If the unused bandwidth ratio A is smaller than the communication bandwidth guarantee factor as a result of the comparison (NO in step S7), the bandwidth controller 204 informs the signaling controller 201 that it is not possible to allocate the sufficient bandwidth to a SVC connection (step S11). Thus, the signaling controller 201 stops the processing of the UNI signaling procedure (step S12). As a result, a useless transmission can be avoided.

In the case of releasing an established SVC connection, the signaling controller 201 outputs the call reference of the SVC connection to be released to the bandwidth controller 204. The bandwidth controller 204 then deletes the registration of the call reference of corresponding SVC connection in the bandwidth management table 206, and updates the transmission allocation value, the currently-used transmission bandwidth value and the unused transmission bandwidth value.

Figure 6:
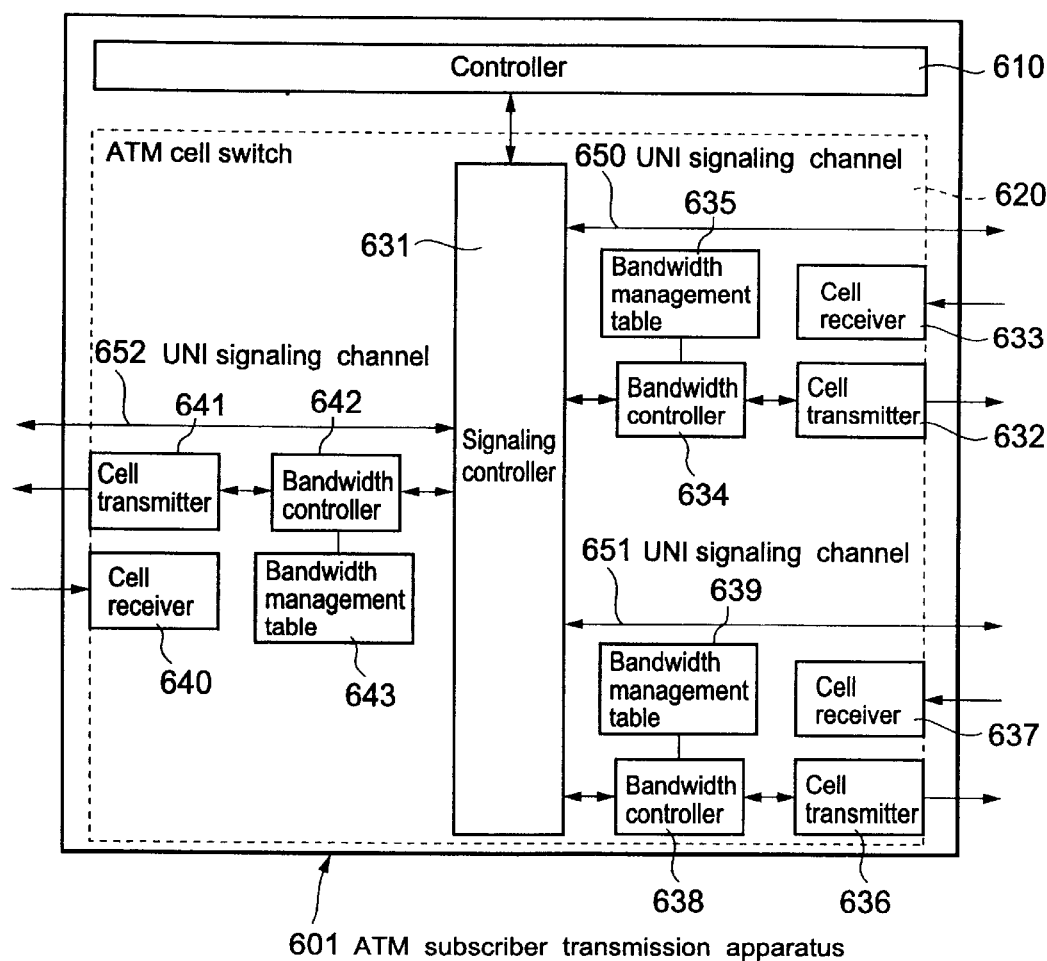
FIG. 6 is a block diagram showing an internal circuit of an ATM subscriber transmission apparatus equipped with the bandwidth control system according to the present invention.

The above-described bandwidth control system of the present invention can be installed in each communication device in the ATM network, such as a subscriber ATM terminal, an ATM subscriber transmission apparatus and an ATM switch (see FIG. 6). The structure and operation will be explained below in the above sequence.

Figure 5:
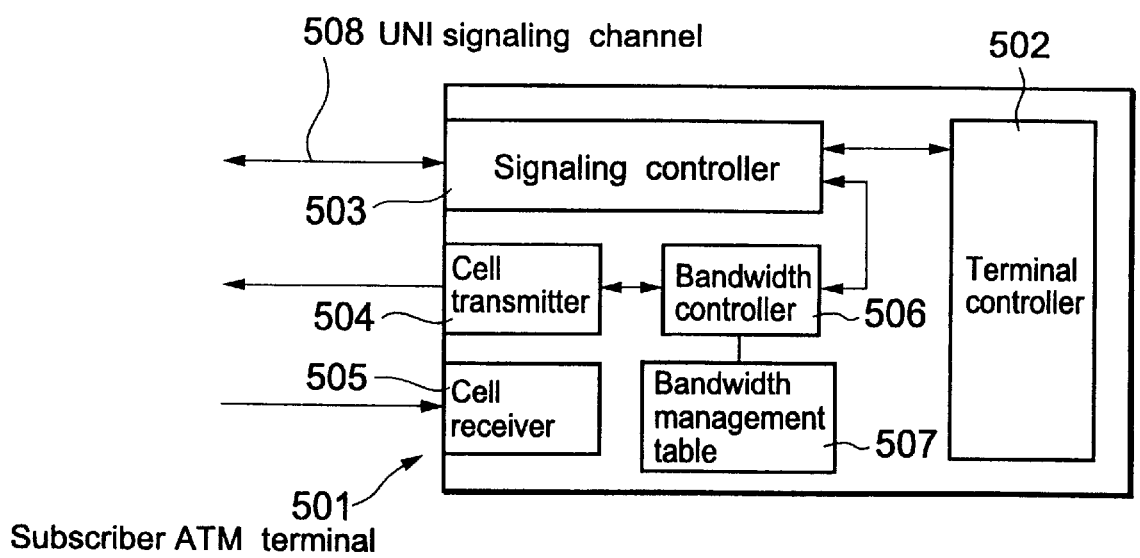
FIG. 5 is a block diagram showing an internal circuit of a subscriber ATM terminal equipped with the bandwidth control system according to the present invention.

Referring to FIG. 5, a subscriber ATM terminal 501 is structured by a signaling controller 503, a cell transmitter 504, a cell receiver 505, a bandwidth controller 506, a bandwidth management table 507 and a terminal controller 502 that constitute the bandwidth control system of the present invention.

The bandwidth controller 506 is connected to the signaling controller 503, the cell transmitter 504 and the bandwidth management table 507. The signaling controller 503 is connected with a UNI signaling channel 508. The cell transmitter 504 and the cell receiver 505 are connected with a data channel.

In the drawing, the terminal controller 502 is illustrated to be connected to only the signaling controller 503. However, the terminal controller 502 controls the operations of the subscriber ATM terminal 501, such as a call originating and a call reception and the like.

The bandwidth control operation in the subscriber ATM terminal 501 with the above-described structure will be explained next with reference to FIG. 5.

In the case where the subscriber ATM terminal 501 makes a call origination, upon receiving a requested value of a communication bandwidth from the terminal controller 502, the signaling controller 503 builds up a SETUP message 311 including a call reference, a requested bandwidth value and calling and called numbers, and outputs this message to the bandwidth controller 506.

Then, the bandwidth controller 506 executes a bandwidth allocation decision processing as shown by steps S2 to S4, S6 to S9 and S11 in FIG. 4, and outputs a result of the decision to the signaling controller 503.

Upon receiving a result of the decision as shown by the steps S4 and S9 in FIG. 4, the signaling controller 503 starts a processing of the UNI signaling procedure. In the mean time, upon receiving a result of the decision as shown by the step S11 in FIG. 4, the signaling controller 503 stops the processing of the UNI signaling procedure and, at the same time, posts to the terminal controller 502 to the effect that the a request for establishing the SVC connection has been rejected.

In the case where the subscriber ATM terminal 501 receives a call, upon receiving the SETUP message 311 from the UNI signaling channel 508, the signaling controller 503 outputs this message to the bandwidth controller 506.

Then, the bandwidth controller 506 executes a bandwidth allocation decision processing, and posts a result of the decision to the signaling controller 503.

Upon receiving a result of the decision as shown by the step S4 in FIG. 4, the signaling controller 503 starts a processing of the UNI signaling procedure. In other words, the signaling controller 503 builds up a return message (CALL PROCEEDING/CONNECT message) and transmits this message using the UNI signaling channel 508 to post that it is possible to establish an SVC connection.

In the mean time, upon receiving a result of the decision as shown by the step S11 in FIG. 4, the signaling controller 503 stops the processing of the UNI signaling procedure. In other words, the signaling controller 503 builds up a return message (RELEASE COMPLETE message) and transmits this message using the UNI signaling channel 508 to post that it is not possible to establish an SVC connection.

As explained above, the subscriber ATM terminal carries out the allocation control of a transmission bandwidth prior to the transmission of a SETUP message or a return message. If the allocation is not possible, the subscriber ATM does not transmit a SETUP message to the ATM network. Therefore, it is possible to reduce the load of processing the UNI signaling procedure in the ATM subscriber transmission apparatus and the switch.

In FIG. 6, the right side thereof is directed to a subscriber ATM terminal, and the left side is directed to an ATM switch of the ATM public network.

Referring to FIG. 6, an ATM subscriber transmission apparatus 601 is broadly divided into a controller 610 and an ATM cell switch 620. The controller 610 controls an overall apparatus including the ATM cell switch 620. The controller 610 is provided with a route selection table for controlling the ATM cell switch 620.

The ATM cell switch 620 has a structure having a plurality of bandwidth control systems of the basic configuration as shown in FIG. 1, the basic configuration including a signaling controller, a cell transmitter, a cell receiver, a bandwidth controller and a bandwidth management table. In this case, however, the signaling controller is shared.

More specifically, the ATM cell switch 620 includes a signaling controller 631, a plurality of cell transmitters 632, 636 and 641, a plurality of cell receivers 633, 637 and 640, a plurality of bandwidth controller 634, 638 and 642, and a plurality of bandwidth management tables 635, 639 and 643. The connection relationship is the same as described above, and its explanation will be omitted.

The signaling controller 631 is connected with UNI signaling channels 650 and 651 connected with a plurality of subscriber ATM terminals (two subscriber ATM terminals in the case of the example shown) and a UNI signaling channel 652 connected with an ATM switch of an ATM public network.

Accordingly, the cell transmitters 632 and 636 and the cell receivers 633 and 637 are connected with data channels respectively connected to the subscriber ATM terminals. Further, the cell transmitter 641 and the cell receiver 640 are connected with data channels respectively connected to the ATM switch of the ATM public network.

The bandwidth control operation of the ATM subscriber transmission apparatus 601 will be explained next with reference to FIGS. 4 and 6. In the case of receiving the SETUP message 311 through the UNI signaling channel 650, for example, the following two bandwidth controls are carried out.

Upon receiving the SETUP message 311 from the subscriber ATM terminal through the UNI signaling channel 650, the signaling controller 631 makes an enquiry to the controller 610 about the call destination by referring to the called number 316 included in the SETUP message 311.

The controller 610 detects the call destination by referring to the route selection table, and informs the signaling controller 631 that the call destination is the UNI signaling channel 652. Then, the signaling controller 631 outputs the received SETUP message 311 to the bandwidth controller 642 of the call destination.

The bandwidth controller 642 executes a bandwidth allocation decision processing as shown by the steps S2–S4, S6–S9 and S11 of FIG. 4 about the transmission bandwidth to the call destination, and posts a result of the decision to the signaling controller 631.

Upon receiving a result of the decision as shown by the step S4 or S9 in FIG. 4, the signaling controller 631 starts a processing of a UNI signaling procedure using the UNI signaling channel 652. Thus, an SVC connection is established between the ATM subscriber transmission apparatus 601 and the called terminal connected to the ATM public network.

In the mean time, upon receiving a result of the decision as shown by the step S11 in FIG. 4, the signaling controller 631 stops the processing of the UNI signaling procedure using the UNI signaling channel 652. The signaling controller 631 informs the subscriber ATM terminal of the call originating side using the UNI signaling channel 650 that a request for establishing an SVC connection has been rejected.

Upon receiving the SETUP message 311 from the subscriber ATM terminal through the UNI signaling channel 650, the signaling controller 631 outputs the received SETUP message 311 to the bandwidth controller 644 at the UNI signaling channel 650 side.

The bandwidth controller 642 executes a bandwidth allocation decision processing as shown by the steps S2–S4, S6–S9 and S11 of FIG. 4 about the transmission bandwidth to the call destination, and posts a result of the decision to the signaling controller 631.

Upon receiving a result of the decision as shown by the step S4 or S9 in FIG. 4, the signaling controller 631 starts a processing of a UNI signaling procedure using the UNI signaling channel 650. Thus, an SVC connection is established between the ATM subscriber transmission apparatus 601 and the subscriber ATM terminal at the corresponding call originator side.

In the mean time, upon receiving a result of the decision as shown by the step S11 in FIG. 4, the signaling controller 631 stops the processing of the UNI signaling procedure using the UNI signaling channel 650. The signaling controller 631 posts to the subscriber ATM terminal of the call originating side using the UNI signaling channel 650 to the effect that a request for establishing an SVC connection has been rejected.

In short, based on both the allocation control of a transmission bandwidth to the call originating side and the allocation control of a transmission bandwidth to the call destination side, it is possible to establish an end-to-end SVC connection through the ATM subscriber transmission apparatus 601. The procedure of releasing the established SVC connection is as described above, and its explanation will be omitted.

The structure of the ATM switch with the bandwidth control system of the present invention built therein can be surmised from the structure of the ATM subscriber transmission apparatus shown in FIG. 6, and the bandwidth control operation therefore is similar to that of the above-described ATM subscriber transmission apparatus. Thus, their explanation will be omitted to avoid duplication.

Figure 7:
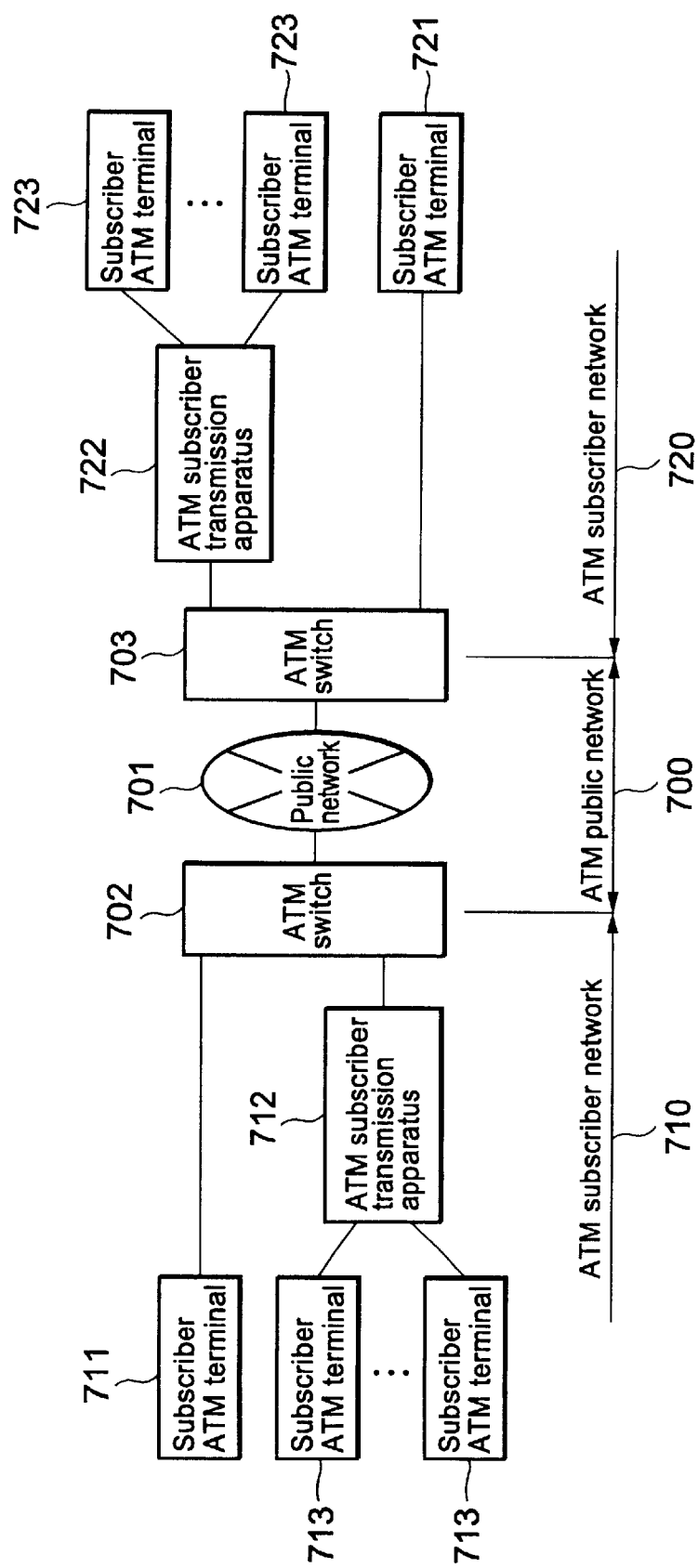
FIG. 7 is an overall configuration diagram of an ATM network structured by communication devices equipped with the bandwidth control system according to the present invention.

Referring to FIG. 7, this ATM network is structured by an ATM public network 700 and ATM subscriber networks 710 and 720 connected to the ATM public network 700. The ATM public network 700 is structured by a public network 701 and its nodes, ATM switches 702 and 703.

The ATM subscriber network 710 at the ATM switch 702 side is composed of a subscriber ATM terminal 711 directly connected to the switch 702, an ATM subscriber transmission apparatus 712 directly connected to the switch 702, and a large number of subscriber ATM terminals 713 accommodated in the ATM subscriber transmission apparatus 712.

The ATM subscriber network 720 at the ATM switch 703 side is similarly composed of a subscriber ATM terminal 721, an ATM subscriber transmission apparatus 722 and a large number of subscriber ATM terminals 723.

Based on the above structure, if, for example in the ATM subscriber network 710, the value of a transmission allocation bandwidth of the bandwidth management table 507 at a certain subscriber ATM terminal 713 is set at the same value as the value of a transmission allocation bandwidth of the bandwidth management table 635, for example, at the ATM subscriber transmission apparatus 712 to which the subscriber ATM terminal 501 is connected, the link between the ATM subscriber transmission apparatus 712 and the subscriber ATM terminal 713 becomes a link with upstream and downstream symmetrical communication bandwidth.

On the other hand, if the value of a transmission allocation bandwidth of the bandwidth management table 507 at the subscriber ATM terminal 713 is set at a value different from the value of a transmission allocation bandwidth of the bandwidth management table 635 at the ATM subscriber transmission apparatus 712, the link between the ATM subscriber transmission apparatus 712 and the subscriber ATM terminal 713 becomes a link with upstream and downstream asymmetrical communication bandwidth.

In short, by only changing the values of the transmission allocation bandwidth in the bandwidth management table without adding the bandwidth management table, it becomes possible to manage the link with upstream and downstream symmetrical communication bandwidth and the link with upstream and downstream asymmetrical communication bandwidth, in the same bandwidth control system.

Further, as the bandwidth control closed within the own apparatus is used in the switches 702 and 703 and the ATM subscriber transmission apparatuses 712 and 722 and cells of an own procedure are not transmitted to the outside of the apparatus, even if there exists an apparatus such as an ATM switch or an ATM subscriber transmission apparatus that transmits cells of own procedure in the ATM network, it is possible to carry out a desired bandwidth control independently.

Accordingly, when the bandwidth control system of the present invention is installed in apparatuses such as an ATM switch and an ATM subscriber transmission apparatus, these apparatuses can be mutually connected and an ATM network such as an ATM public network and an ATM subscriber network can be constructed flexibly.

As explained above, according to the present invention, allocation control is carried out for only the transmission bandwidth in carrying out a bandwidth control closed within the own apparatus. Accordingly, it becomes possible to reduce the capacity of the bandwidth management table. Further, even if upstream and downstream asymmetrical communication is carried out, this can be coped with by changing the set value of the bandwidth management table. This can avoid the need for installing a new bandwidth management table.

Further, in the bandwidth control allocation, even if a requested value is larger than an unused bandwidth value, a bandwidth can be allocated so long as the requested value meets a communication bandwidth guarantee factor. As the bandwidth can be allocated flexibly, a refusal rate of a request for establishing an SVC connection can be lowered. Further, surplus of communication bandwidth can also be minimized.

Furthermore, as the bandwidth control is carried out closed within the own apparatus, apparatuses such as an ATM switch and an ATM subscriber transmission apparatus can be mutually connected and an ATM network such as an ATM public network and an ATM subscriber network can be constructed flexibly.

Moreover, as the bandwidth allocation control is carried out in the subscriber ATM terminal as well, it is not necessary for the ATM switch and the ATM subscriber transmission apparatus to carry out the processing of the UNI signaling procedure when a bandwidth allocation is not possible. This can reduce the load of processing.

In short, according to the present invention, a flexible control and an effective utilization of bandwidth in an ATM network becomes possible, and an ATM network can be constructed flexibly.

What is claimed is:

1. A bandwidth control system in a communication device for performing communication in an ATM (Asynchronous Transfer Mode) scheme, comprising:
   a transceiver for transmitting and receiving ATM cells to and from another communication device through a link;
   a transmission bandwidth controller for making a decision as to whether it is possible to allocate a requested transmission bandwidth for requested data transmission through the link by referring to a bandwidth management table; and
   a signaling controller for enabling a UNI (User-Network Interface) signaling procedure based on a result of the decision of transmission bandwidth allocation,
   wherein
      if it is possible to allocate the requested transmission bandwidth, the signaling controller produces a SETUP message for making a request for establishing a virtual channel having the requested transmission bandwidth in the link, and starts the UNI signaling procedure, and
      if it is not possible to allocate the requested transmission bandwidth, the signaling controller stops the UNI signaling procedure.

2. The bandwidth control system according to claim 1, wherein the communication device is one of an ATM subscriber terminal, an ATM subscriber transmission device, and an ATM switch.

3. A bandwidth control system in a communication device for performing communication in an ATM (Asynchronous Transfer Mode) scheme, comprising:
   a transceiver for transmitting and receiving ATM cells to and from another communication device through a link;
   a transmission bandwidth controller for making a decision as to whether it is possible to allocate a requested transmission bandwidth for requested data transmission through the link by referring to a bandwidth management table;
   a signaling controller for enabling a UNI (User-Network Interface) signaling procedure based on a result of the decision of transmission bandwidth allocation,
   wherein the transmission bandwidth controller holds a communication bandwidth guarantee factor, and if the requested transmission bandwidth is greater than an available transmission bandwidth in the link, the transmission bandwidth controller compares an available bandwidth ratio of the available transmission bandwidth to the requested transmission bandwidth with the communication bandwidth guarantee factor to make a decision as to whether it is possible to allocate a practicable transmission bandwidth for the data transmission; and
   wherein,
      if the available bandwidth ratio is greater than the communication bandwidth guarantee factor, then the transmission bandwidth controller reduces the requested transmission bandwidth into a practicable transmission bandwidth and determines that it is possible to allocate the practicable transmission bandwidth, thereafter the signaling controller produces a SETUP message for making a request for establishing the virtual channel having the practicable transmission bandwidth in the link, and then starts the UNI signaling procedure, and
      if the available bandwidth ratio is smaller than the communication bandwidth guarantee factor, then the transmission bandwidth controller determines that it is not possible to allocate a practicable transmission bandwidth and the signaling controller stops the UNI signaling procedure.

4. A bandwidth control method in a communication device having a transceiver for transmitting and receiving ATM cells to and from another communication device through a link, comprising the steps of:
   a) determining whether it is possible to allocate a requested transmission bandwidth for requested data transmission by referring to a bandwidth management table; and
   b) enabling a UNI (User-Network Interface) signaling procedure based on a result of the decision of transmission bandwidth allocation;
      wherein the step b) comprises the steps of:
         producing a SETUP message for making a request for establishing a connection having the requested transmission bandwidth in the link to start the UNI signaling procedure if it is possible to allocate the requested transmission bandwidth; and
         stopping the UNI signaling procedure if it is not possible to allocate the requested transmission bandwidth.

5. The bandwidth control method according to claim 4, wherein the communication device is one of an ATM subscriber terminal, an ATM subscriber transmission device, and an ATM switch.

6. A bandwidth control method in a communication device having a transceiver for transmitting and receiving ATM cells to and from another communication device through a link, comprising the steps of:
   a) determining whether it is possible to allocate a requested transmission bandwidth for requested data transmission by referring to a bandwidth management table; and
   b) enabling a UNI (User-Network Interface) signaling procedure based on a result of the decision of transmission bandwidth allocation;
      wherein the step a) comprises the steps of:
         a-1) storing a communication bandwidth guarantee factor;
         a-2) comparing an available bandwidth ratio of the available transmission bandwidth to the requested transmission bandwidth with the communication bandwidth guarantee factor if the requested transmission bandwidth is greater than an available transmission bandwidth; and
         a-3) determining based on a comparison result whether it is possible to allocate a guaranteed transmission bandwidth for the data transmission;

wherein, the step a-3) comprises the steps of:
determining that it is possible to allocate the guaranteed transmission bandwidth if the available bandwidth ratio is greater than the communication bandwidth guarantee factor; and
reducing the requested transmission bandwidth into the guaranteed transmission bandwidth; and
determining that it is not possible to allocate the available transmission bandwidth if the available bandwidth ratio is smaller than the communication bandwidth guarantee factor,
the step b) comprises the steps of:
producing a SETUP message for making a request for establishing a connection having the guaranteed transmission bandwidth in the link to start the UNI signaling procedure if it is determined that it is possible to allocate the guaranteed transmission bandwidth; and
stopping the processing of the UNI signaling procedure if it is determined that it is not possible to allocate the guaranteed transmission bandwidth.

7. A bandwidth control system for a link between communication devices communicating with each other in an ATM (Asynchronous Transfer Mode) scheme,
each of the communication devices comprising:
a transceiver for transmitting and receiving ATM cells to and from another communication device through the link;
a bandwidth management table containing a call reference, an allocated transmission bandwidth, a currently-used transmission bandwidth, and an unused transmission bandwidth;
a bandwidth controller for controlling a bandwidth for only data transmission using the bandwidth management table and for making a decision as to whether it is possible to allocate a requested transmission bandwidth for requested data transmission through the link by referring to the bandwidth management table;
a signaling controller for enabling a UNI (User-Network Interface) signaling procedure based on a result of the decision of transmission bandwidth allocation;
wherein, if it is possible to allocate the requested transmission bandwidth, the signaling controller produces a SETUP message for making a request for establishing a transmission virtual channel having the requested transmission bandwidth in the link, and starts the UNI signaling procedure, and
if it is not possible to allocate the requested transmission bandwidth, the signaling controller stops the UNI signaling procedure.

8. The bandwidth control system according to claim 7, wherein the bandwidth controller holds a communication bandwidth guarantee factor, and if the requested transmission bandwidth is greater than an available transmission bandwidth in the link, the transmission bandwidth controller compares an available bandwidth ratio of the available transmission bandwidth to the requested transmission bandwidth with the communication bandwidth guarantee factor to make a decision as to whether it is possible to allocate a practicable transmission bandwidth for the data transmission;
wherein if the available bandwidth ratio is greater than the communication bandwidth guarantee factor, then the bandwidth controller reduces the requested transmission bandwidth into a practicable transmission bandwidth and determines that it is possible to allocate the practicable transmission bandwidth, thereafter the signaling controller produces a SETUP message for making a request for establishing the virtual channel having the practicable transmission bandwidth in the link, and then starts the UNI signaling procedure, and
if the available bandwidth ratio is smaller than the communication bandwidth guarantee factor, then the bandwidth controller determines that it is not possible to allocate a practicable transmission bandwidth and the signaling controller stops the UNI signaling procedure.

9. The bandwidth control system according to claim 7, wherein the communication devices are one of a combination of an ATM subscriber terminal and an ATM subscriber transmission device and another combination of an ATM subscriber terminal and an ATM switch.

10. The bandwidth control system according to claim 7, wherein a first transmission bandwidth in a direction from one communication device to the other communication device and a second transmission bandwidth in the opposite direction are asymmetrical.

* * * * *